United States Patent Office

2,750,401
ESTER OF N,N-BIS(2-CYANOETHYL) CARBOXAMIC ACIDS

John Wendell Lynn, South Charleston, W. Va., assignor to Union Carbide and Carbon Corporation, a corporation of New York No Drawing. Application April 22, 1953,
Serial No. 350,513

5 Claims. (Cl. 260—464)

This invention relates to new organic compounds. More particularly, this invention relates to the esters of N,N-bis (2-cyanoethyl) carboxamic acids which are useful as plasticizers.

Since polyvinyl resins are generally too hard and rigid to be used for many purposes without a plasticizer, it is usually necessary to add a plasticizer to make the resins soft, pliable and capable of being milled into strong pliable sheets or films. It is also advantageous that the plasticized resin compositions have heat stability, suppleness and elasticity. In order for a material to be useful as a plasticizer it is necessary that it be compatible with the resin and not exude or sweat out, leaving the resin unplasticized. Therefore, it is an object of my invention to provide compounds of the class described above which are improved plasticizers for polyvinyl resins.

The compounds of my invention are useful in plasticizing vinyl resins, including, for example, the vinyl chloride-acetate resins, the vinyl chloride resins, the vinyl chloride-acetate-maleic acid resins, the vinyl chloride-acrylonitrile-vinyl acetate resins and the vinyl chloride acrylonitrile resins. More particularly, the plasticizers comprising my invention are useful in plasticizing vinyl chloride-acrylonitrile copolymers.

My new compounds impart excellent flexibility characteristics to resin compositions and more particularly the use of my new plasticizers with vinyl chloride-acrylonitrile resin compositions provides additional uses of vinyl chloride-acrylonitrile plasticized compositions in the fields of cloth coatings, paper coatings, metal coatings, wire coatings, calendered sheets and molded articles where low-temperature flexibility is an important feature.

The new compounds may be obtained by reacting the cyclic anhydride of a dibasic acid with di-(2-cyanoethyl) amine and then esterifying the resulting N,N-bis(2-cyanoethyl) carboxamic acid with an alcohol. The starting material, di(2-cyanoethyl) amine, may be readily prepared by the reaction of acrylonitrile with ammonia.

The reaction of di(2-cyanoethyl) amine with the cyclic anhydride of the dicarboxylic acid gives the corresponding N,N-bis(2-cyanoethyl) carboxamic acid in excellent yield. Esterification of these amic acids with alcohols produces the esters of the N,N-bis(2-cyanoethyl) carboxamic acids.

The reaction whereby the N,N-bis(2-cyanoethyl) carboxamic acid esters are produced in accordance with my invention may be written as follows:

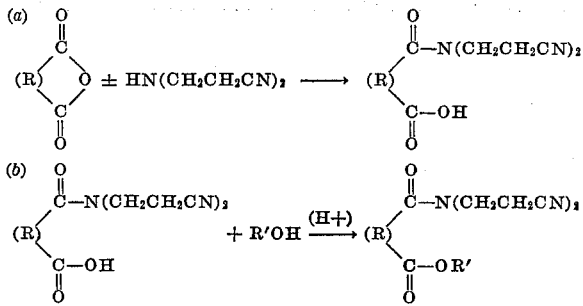

wherein R represents a member selected from the group consisting of tetrahydrophenylene and Δ⁵-1,4-endomethylene tetrahydrophenylene radicals and R' represents an aliphatic hydrocarbon radical containing from 1 to 8 carbon atoms.

The acids of the type above defined do not appear in the prior art and are therefore new compounds forming a part of this invention.

In general, the new compounds of this invention may be prepared by adding di(2-cyanoethyl) amine slowly to a slurry of the cyclic anhydride in benzene at a temperature in the range of 50 to 80° C. and the mixture is then stirred at the reflux temperature for a short period of time. Upon cooling the N,N-bis(2-cyanoethyl) carboxamic acids are crystallized from the solution.

The N,N-bis(2-cyanoethyl) carboxamic acids prepared were colorless crystalline solids, fairly soluble in water and alcohols, quite insoluble in hydrocarbons and were fairly unstable at moderately high temperatures.

The esters of the N,N-bis(2-cyanoethyl) carboxamic acids may be prepared by esterification of the isolated and purified amic acid or by direct esterification of the crude amic acid, the water formed during the esterification reaction may be removed by azeotropic distillation and the esters are usually taken as residue products after steam-stripping to remove the volatile by products. The cyclic anhydrides employed in the preparation of the N,N-bis-(2-cyanoethyl) carboxamic acids are 4-cyclohexene-1,2-dicarboxylic acid anhydride and bicyclo-[2.2.1]-5-heptene-2,3-dicarboxylic acid anhydride otherwise known as Δ⁵ - 1,4-endomethylene tetrahydrophenylene-2,3-dicarboxylic acid anhydride.

The alcohols employed in the esterification reaction may be any suitable alcohol and includes both the aliphatic and aromatic alcohols, such as, for example, methanol, ethanol, isopropanol, butanol, 2-ethylbutanol, 2-ethylhexanol, furfuryl alcohol, tetrahydrofurfuryl alcohol, benzyl alcohol, allyl alcohol and diethylene glycol.

In its broadest aspects, my invention is directed to the esters of N,N-bis(2-cyanoethyl) carboxamic acids having the general formula:

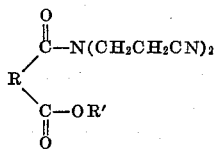

wherein R represents a member selected from the group consisting of tetrahydrophenylene and Δ⁵-1,4-endomethylene tetrahydrophenylene radicals and R' represents an aliphatic hydrocarbon radical.

The following examples will serve to illustrate the practice of the invention.

EXAMPLE I

*N,N-bis(2-cyanoethyl)-4-cyclohexene-1,2-carboxamic acid*

To one mole of 4-cyclohexene-1,2-dicarboxylic acid anhydride in refluxing benzene was added one mole of B,B'-iminodipropionitrile and the mixture was heated for one hour. The solid which formed on cooling was removed and crystallized from ethanol. The N,N-bis(2-cyanoethyl)-4-cyclohexene-1,2-carboxamic acid was obtained as colorless crystals melting at 130–133° C. in a 95% yield and having the structural formula:

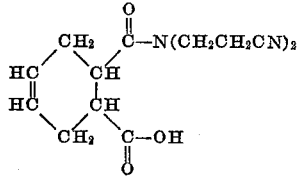

The product contained 15.23% N which corresponds to the theoretical quantity of 15.49% N.

EXAMPLE II

*N,N-bis(2-cyanoethyl) bicyclo [2.2.1]-5-heptene-2,3-carboxamic acid*

To a stirred suspension of one mole of bicyclo-2.2.1-5-heptene-2,3-dicarboxylic acid anhydride in benzene at a temperature of 50° C. was added one mole of B,B'-iminodipropionitrile and the mixture was reacted for two hours. One mole of a 10% sodium hydroxide solution was added to the reaction mixture and the aqueous layer separated. Acidification of the aqueous layer precipitated the amic acid which was removed and crystallized in water. A 92% yield of N,N-bis(2-cyanoethyl) bicyclo-[2.2.1]-5-heptene-2,3-carboxamic acid was obtained as colorless crystals melting at 133–135° C. and having the structural formula:

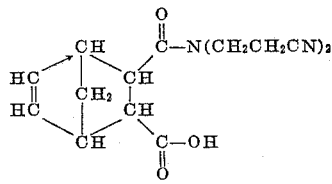

The product contained 15.08% N which corresponds to the theoretical quantity of 14.65% N.

EXAMPLE III

*Butyl N,N-bis(2-cyanoethyl)-4-cyclohexene-1,2-carboxamate*

One mole of B,B'-iminodipropionitrile was added slowly to a stirred suspension of 4-cyclohexene-1,2-dicarboxylic acid anhydride in refluxing benzene and the mixture reacted for one hour. Ten mols of butanol and 0.5 gram of sulfuric acid were added to the mixture and the mixture refluxed for two days. The water formed during the reaction was removed azeotropically. The reaction mixture was then washed with sodium carbonate and the solvent removed. Butyl N,N-bis(2-cyanoethyl)-4-cyclohexene-1,2-carboxamate was obtained in a 58% yield as a crude residue product.

EXAMPLE IV

*Ethylbutyl N,N-bis(2-cyanoethyl) bicyclo-[2.2.1]-5-heptene-2,3-carboxamate*

One mol of B,B'-iminodipropionitrile was added slowly to a stirred suspension of bicyclo [2.2.1]-5-heptene-2,3-dicarboxylic acid anhydride in refluxing benzene and the mixture reacted for one hour. Two mols of 2-ethylbutanol and one gram of p-toluene sulfonic acid were added to the mixture and the mixture was refluxed for two days. The water formed during the reaction was removed azeotropically. The reaction mixture was then washed with sodium carbonate and the solvent removed. Ethylbutyl N,N - bis(2 - cyanoethyl) bicyclo - [2.2.1] - 5-heptene - 2,3 - carboxamate was obtained in 62% yield as a crude residue product.

I claim:

1. Esters of N,N-bis(2-cyanoethyl) carboxamic acids having the general formula:

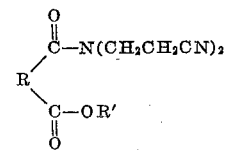

wherein R represents a member selected from the group consisting of tetrahydrophenylene and Δ⁵–1,4-endomethylene tetrahydrophenylene radicals and R' represents an aliphatic hydrocarbon radical containing from 1 to 8 carbon atoms.

2. Esters of N,N-bis(2-cyanoethyl) carboxamic acids having the general formula:

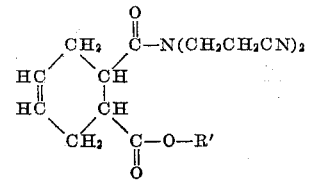

wherein R' represents an aliphatic hydrocarbon radical containing from 1 to 8 carbon atoms.

3. Esters of N,N-bis(2-cyanoethyl) carboxamic acids having the general formula:

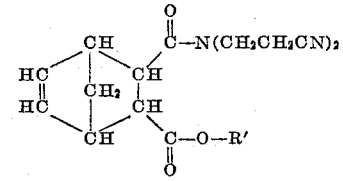

wherein R' represents an aliphatic hydrocarbon radical containing from 1 to 8 carbon atoms.

4. Butyl N,N-bis(2-cyanoethyl) tetrahydro-phthalamate represented by the formula:

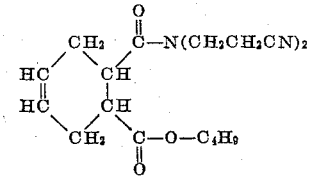

5. 2-ethylbutyl N,N-bis(2-cyanoethyl) bicyclo [2.2.1]-5-heptene-2,3-carboxamate represented by the formula:

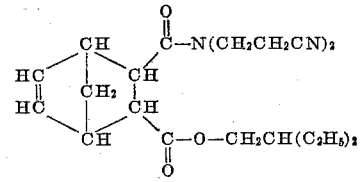

References Cited in the file of this patent

UNITED STATES PATENTS

| 2,462,835 | Arnold et al. | Mar. 1, 1949 |
| 2,478,299 | Miller | Aug. 9, 1949 |